United States Patent
Yuuya et al.

(10) Patent No.: US 7,612,486 B2
(45) Date of Patent: Nov. 3, 2009

(54) ULTRASONIC PROBE, BACKING MATERIAL FOR ULTRASONIC PROBE, AND METHOD OF MANUFACTURING THE SAME

(75) Inventors: Shigenori Yuuya, Ashigarakami-gun (JP); Takashi Nakamura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/135,695

(22) Filed: Jun. 9, 2008

(65) Prior Publication Data
US 2008/0303381 A1 Dec. 11, 2008

(30) Foreign Application Priority Data
Jun. 11, 2007 (JP) .............................. 2007-153524

(51) Int. Cl.
*H01L 41/00* (2006.01)
(52) U.S. Cl. ....................................... 310/326; 310/334
(58) Field of Classification Search ................. 310/326, 310/327, 334
See application file for complete search history.

(56) References Cited

U.S. PATENT DOCUMENTS 7,432,638 B2 * 10/2008 Yamashita et al. .......... 310/335

FOREIGN PATENT DOCUMENTS

| JP | 2000-183376 A | * | 6/2000 |
| JP | 2003-190162 A | | 7/2003 |

* cited by examiner

*Primary Examiner*—Thomas M Dougherty
(74) *Attorney, Agent, or Firm*—Sughrue Mion, PLLC

(57) ABSTRACT

A backing material that is advantageous in insulation property and can realize a desired acoustic impedance without making the cross-linking and curing reaction of elastomer or resin as a parent material unstable. The backing material is provided on a backside of vibrators for transmitting and/or receiving ultrasonic waves in an ultrasonic probe, and the backing material includes: a parent material containing elastomer or resin and having an insulation property; and composite powder dispersed to fill the parent material, and the composite powder includes powder of a material having a larger acoustic impedance than that of the parent material and an insulation coating for covering a surface of the powder, and the insulation coating contains an oxide of an element of group XIII to group XV except for carbon (C), nitrogen (N), phosphorus (P).

9 Claims, 5 Drawing Sheets

- 10 PARENT MATERIAL
- 11 HIGH SPECIFIC GRAVITY POWDER
- 12 INSULATION COATING

- 10 PARENT MATERIA
- 13 HIGH SPECIFIC GRAVITY POWDER

FIG.5A

| SAMPLE No. | MEDIAN DIAMETER (μm) | AMOUNT OF TEOS (g) | EQUIVALENT $SiO_2$ THICKNESS (μm) |
|---|---|---|---|
| 1 | 4.8 | 1.0 | 0.082 |
| 2 | 4.8 | 1.5 | 0.123 |
| 3 | 4.8 | 3.0 | 0.245 |
| 4 | 4.8 | 5.0 | 0.409 |
| 5 | 8.7 | 0.5 | 0.074 |
| 6 | 8.7 | 1.0 | 0.148 |
| 7 | 8.7 | 1.5 | 0.222 |
| 8 | 8.7 | 5.0 | 0.741 |

FIG.5B

| SAMPLE No. | MEDIAN DIAMETER (μm) | AMOUNT OF Al-i-Pr (g) | EQUIVALENT $Al_2O_3$ THICKNESS (μm) |
|---|---|---|---|
| 9 | 4.8 | 1.0 | 0.040 |
| 10 | 4.8 | 1.5 | 0.060 |
| 11 | 4.8 | 3.0 | 0.120 |
| 12 | 4.8 | 5.0 | 0.200 |
| 13 | 8.7 | 1.0 | 0.073 |
| 14 | 8.7 | 1.5 | 0.109 |
| 15 | 8.7 | 3.0 | 0.218 |
| 16 | 8.7 | 5.0 | 0.363 |

| SAMPLE No. | CLASSIFI-CATION | COATING THICKNESS ($\mu$m) | ACOUSTIC IMPEDANCE (MRayl) | SPECIFIC RESISTANCE ($\Omega \cdot$cm) |
|---|---|---|---|---|
| 1 | WORKING EXAMPLE | 0.082 | 12.0 | $10^8$ |
| 2 | | 0.123 | 12.1 | $10^{10}$ |
| 3 | | 0.245 | 11.4 | $>10^{12}$ |
| 4 | | 0.409 | 10.1 | $>10^{12}$ |
| 5 | | 0.074 | 11.9 | $10^8$ |
| 6 | | 0.148 | 12.1 | $10^{11}$ |
| 7 | | 0.222 | 12.0 | $>10^{12}$ |
| 8 | | 0.741 | 9.9 | $>10^{12}$ |
| 9 | | 0.040 | 11.9 | $5 \times 10^5$ |
| 10 | | 0.060 | 12.0 | $10^8$ |
| 11 | | 0.120 | 11.9 | $10^{11}$ |
| 12 | | 0.200 | 11.8 | $>10^{12}$ |
| 13 | | 0.073 | 12.0 | $10^7$ |
| 14 | | 0.109 | 12.1 | $10^{10}$ |
| 15 | | 0.218 | 12.1 | $>10^{12}$ |
| 16 | | 0.363 | 11.9 | $>10^{12}$ |
| 17 | COMPARATIVE EXAMPLE | 0.0 | 8.2 ~ 11.5 | $5 \times 10^2$ ~ $2 \times 10^3$ |
| 18 | | 0.0 | 8.7 ~ 11.8 | $10^2$ ~ $5 \times 10^2$ |

ULTRASONIC PROBE, BACKING MATERIAL FOR ULTRASONIC PROBE, AND METHOD OF MANUFACTURING THE SAME

BACKGROUND OF THE INVENTION

1. Field of the Invention

The present invention relates to an ultrasonic probe to be used for transmitting and receiving ultrasonic waves in an ultrasonic diagnostic apparatus. The present invention further relates to a backing material to be used for absorbing unwanted ultrasonic waves in the ultrasonic probe, and a method of manufacturing the backing material.

2. Description of a Related Art

An ultrasonic diagnostic apparatus transmits ultrasonic waves to an object to be inspected such as a human body or structure and receives ultrasonic echoes reflected from the object by using an ultrasonic probe, and displays images based on detection signals of ultrasonic waves. Thereby, examinations of organs and blood vessels within a body and nondestructive inspections within a structure are performed.

In the ultrasonic probe, as an ultrasonic transducer for transmitting and/or receiving ultrasonic waves, a vibrator (piezoelectric vibrator) having electrodes formed on both sides of a piezoelectric material such as piezoelectric ceramics represented by PZT (Pb(lead) zirconate titanate), a polymeric piezoelectric material represented by PVDF (polyvinylidene difluoride) is generally used.

When a voltage is applied to the electrodes of the vibrator, the piezoelectric material expands and contracts due to the piezoelectric effect and generates elastic waves. Further, plural vibrators are one-dimensionally or two-dimensionally arranged and driven by plural drive signals with predetermined delays, and thereby, an ultrasonic beam can be formed in a desired direction. On the other hand, the vibrators expand and contract when receiving propagating ultrasonic waves and generate electric signals. The electric signals are used as detection signals of the ultrasonic waves.

Generally, the vibrators are formed on a backing material and an acoustic matching layer and, according to need, an acoustic lens are further formed on the vibrators. The backing material has a function of absorbing unwanted ultrasonic waves to be emitted from the backsides of the vibrators. If the backing material has poor acoustic characteristics, it cannot sufficiently absorb unwanted ultrasonic waves but may cause degradation of image quality of ultrasonic waves.

Further, when plural vibrators are one-dimensionally or two-dimensionally arranged in an arrayed structure, the wiring becomes complicated. In this regard, it is conceivable that the structure of the ultrasonic probe is compactly configured by forming a signal wiring structure on the side or within the backing material. In this case, if the backing material has conductivity, the wiring may be shorted or noise may be mixed. Therefore, the backing material requires an insulation property.

In order to suppress the reflection of ultrasonic waves at an interface between the vibrators and the backing material and attenuate the transmitted ultrasonic waves, it is desirable that the value of the acoustic impedance of the backing material is closer to the value of the acoustic impedance of the vibrators. Further, the acoustic matching layer matches the acoustic impedance of the vibrators with the acoustic impedance of a human body or the like and reduces the reflection of ultrasonic waves.

The acoustic impedance is a constant intrinsic to a material as expressed by equations (1) or (2), and the unit of MRayl (mega Rayl) is generally used therefor, and 1MRayl $=1\times10^6 \text{kg}\cdot\text{m}^{-2}\cdot\text{s}^{-1}$.

$$Z=\rho\cdot v \tag{1}$$

$$Z=(\rho\cdot K)^{1/2} \tag{2}$$

where "$\rho$" represents density of an acoustic medium, "v" represents acoustic velocity within the acoustic medium, and "K" represents a bulk modulus of the acoustic medium. The acoustic impedance of typical piezoelectric ceramics is about 25MRayl to 35MRayl, while the acoustic impedance of a human body is about 1.5MRayl.

Given that the acoustic impedance of the vibrator is $Z_1$ and the acoustic impedance of the backing material is $Z_2$, the vertical reflectance of ultrasonic waves at the interface between the vibrator and the backing material is given by the following equation (3).

$$I_R/I_0=|Z_2-Z_1|/(Z_2+Z_1) \tag{3}$$

where $I_0$ represents acoustic pressure of ultrasonic waves entering the interface and $I_R$ represents acoustic pressure of ultrasonic waves reflected at the interface.

Further, the vertical transmittance of ultrasonic waves at the interface between the vibrator and the backing material is given by the following equation (4).

$$I_T/I_0=2\cdot Z_2/(Z_2+Z_1) \tag{4}$$

where $I_T$ represents acoustic pressure of ultrasonic waves transmitted through the interface.

A material having a large attenuation rate like rubber as a kind of elastomer (elastic polymer compound) is desirable for the backing material. However, if only rubber is used, the acoustic impedance of the backing material becomes as small as about 1MRayl because the rubber has low density and low balk modulus. For this reason, the acoustic impedance is made higher by dispersing powder of an inorganic material having high specific gravity in an elastomer or resin to make composition.

As an inorganic material having high specific gravity, tungsten (W; density 19,200 kg/m$^3$), tantalum (Ta; density 16,700 kg/m$^3$), gold (Au; density 19,300 kg/m$^3$), platinum (Pt; density 21,100 kg/m$^3$), iridium (Ir; density 22,700 kg/m$^3$), tungsten carbide (WC; density 15,600 kg/m$^3$), tantalum carbide (TaC; density 14,500 kg/m$^3$), tungsten silicide (WSi$_2$), or the like is used.

However, all of these materials are conductive and, if the filling rate of the powder is made higher, the backing material itself becomes conductive. That is, percolation conduction occurs, in which many powder particles filled therein contact one another and form conduction paths. Further, since the materials are transition metals or partially contain transition metals, the cross-linking and curing reaction of the elastomer or resin becomes unstable due to the catalyst effect of the transition metals, and therefore, it is difficult to obtain a backing material having homogeneous acoustic characteristics.

As a related technology, Japanese Patent Application Publication JP-P2003-190162A discloses a method of manufacturing a backing for an ultrasonic probe in order to improve acoustic property of the backing. The method of manufacturing a backing includes the first step of manufacturing plural compounds and the second step of manufacturing a backing by mixing the plural compounds in a parent material, and the first step includes an adding step of adding a second material and a third material to a first material having fluidity, a curing step of curing the first material to which the second material and the third material have been added to produce an original compound material, and a step of crushing the original compound material to produce plural compounds.

However, as shown in FIG. 1 of JP-P2003-190162A, particles 28 of the second material having conductivity such as tungsten are exposed on the surface of compounds 24 manufactured in the first step, and, if the filling rate of the compounds 24 is made higher, percolation conduction occurs. On the other hand, if the filling rate of the compounds 24 is lower, it is impossible to make the acoustic impedance of the backing higher. Further, since the particles 28 containing a transition metal such as tungsten are exposed, the curing reaction of a parent material 22 or a base material 26 such as silicone rubber or urethane resin becomes inhomogeneous due to their catalyst effect. That is, the curing reaction quickly occurs at the part in contact with the particles 28, and inhomogeneous filling rate and air bubble mixture are caused. Furthermore, since the composite material is produced and crushed to manufacture the plural compounds, and then, those compounds are mixed in the parent material, the manufacturing process of the backing becomes complicated.

SUMMARY OF THE INVENTION

The present invention has been achieved in view of the above-mentioned problems. A purpose of the present invention is to provide a backing material that is advantageous in insulation property and can realize a desired acoustic impedance without making the cross-linking and curing reaction of elastomer or resin as a parent material unstable. A further purpose of the present invention is to provide a high-performance compact ultrasonic probe using the backing material.

In order to accomplish the above-mentioned purposes, a backing material according to one aspect of the present invention is a backing material provided on a backside of vibrators for transmitting and/or receiving ultrasonic waves in an ultrasonic probe, and the backing material includes: a parent material containing elastomer or resin and having an insulation property; and composite powder dispersed to fill the parent material, and the composite powder includes powder of a material having a larger acoustic impedance than that of the parent material and an insulation coating for covering a surface of the powder, and the insulation coating contains an oxide of an element of group XIII to group XV except for carbon (C), nitrogen (N), phosphorus (P).

Further, an ultrasonic probe according to one aspect of the present invention includes vibrators for transmitting and/or receiving ultrasonic waves, and the backing material according to the present invention.

Furthermore, a method of manufacturing a backing material according to one aspect of the present invention is a method of manufacturing a backing material provided on a backside of vibrators for transmitting and/or receiving ultrasonic waves in an ultrasonic probe, and the method includes the steps of: preparing a parent material containing elastomer or resin and having an insulation property; adding an alkoxide of an element of group XIII to group XV except for carbon (C), nitrogen (N), phosphorus (P) and powder of a material having a larger acoustic impedance than that of the parent material into anhydrous alcohol and stirring them to make a mixture liquid; adding alcohol and water into the mixture liquid for hydrolysis of the alkoxide in the mixture liquid and heating the mixture liquid for evaporation of the alcohol and water to form an insulation coating containing an oxide of an element of group XIII to group XV except for carbon (C), nitrogen (N), phosphorus (P) on a surface of the powder so as to make composite powder; and dispersing the composite powder to fill the parent material and curing the parent material with a curing agent.

According to the present invention, by dispersing the composite powder, which is formed by covering surfaces of powder of a material having a larger acoustic impedance than that of the parent material with the insulation coating of oxide, to fill the parent material, a backing material can be provided that is advantageous in insulation property and can realize a desired acoustic impedance without making the cross-linking and curing reaction of elastomer or resin as a parent material unstable.

BRIEF DESCRIPTION OF THE DRAWINGS

FIG. 5A is a table showing data of plural samples to be used in the method of manufacturing the backing material according to the one embodiment of the present invention;

FIG. 5B is a table showing data of plural samples to be used in the method of manufacturing the backing material according to the one embodiment of the present invention;

DESCRIPTION OF THE PREFERRED EMBODIMENTS

Figure 1:
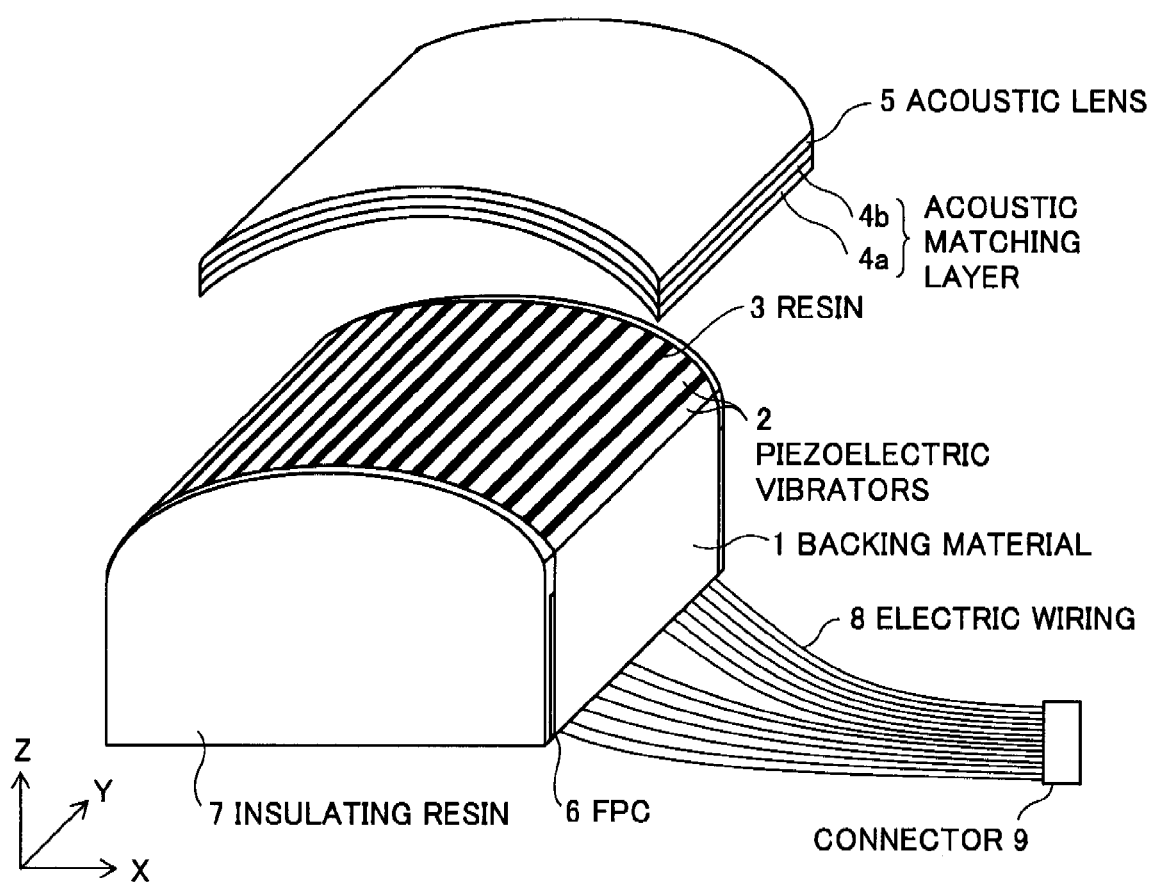
FIG. 1 is a perspective view schematically showing an internal structure of an ultrasonic probe according to one embodiment of the present invention.

Hereinafter, preferred embodiments of the present invention will be explained in detail with reference to the drawings. The same reference numerals will be assigned to the same component elements and the description thereof will be omitted.

Figure 2:
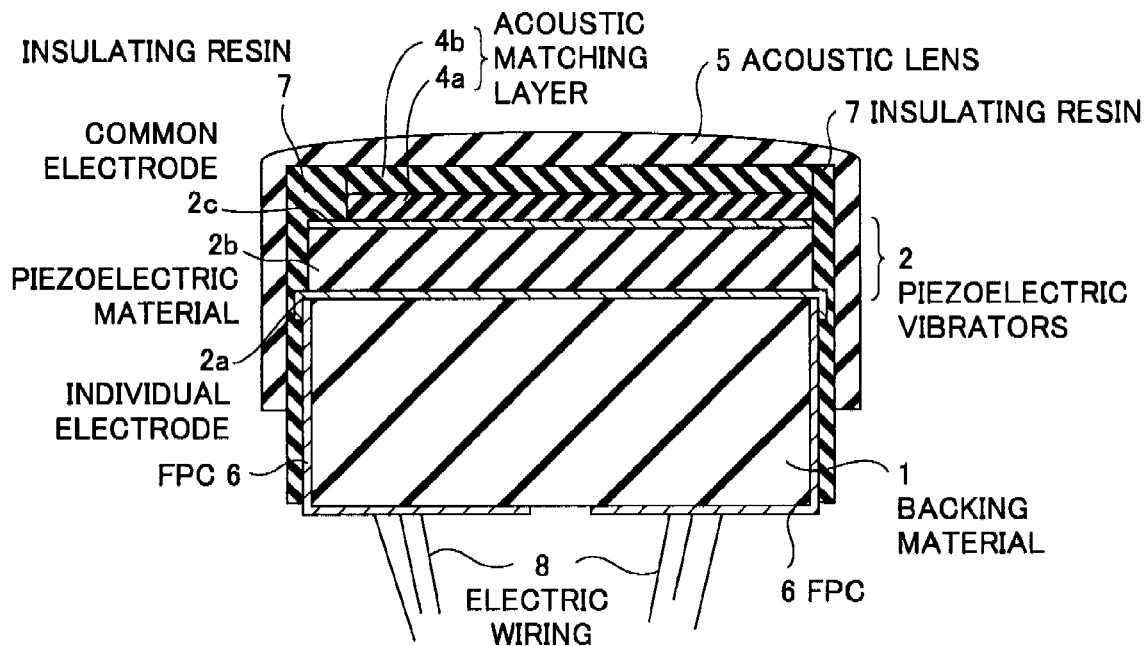
FIG. 2 is a sectional view of the internal structure of the ultrasonic probe shown in FIG. 1 along a plane in parallel with the YZ-plane.

FIG. 1 is a perspective view schematically showing an internal structure of an ultrasonic probe according to one embodiment of the present invention, and FIG. 2 is a sectional view of the internal structure of the ultrasonic probe shown in FIG. 1 along a plane in parallel with the YZ-plane. Here, a convex one-dimensional array probe to be used in an ultrasonic endoscope will be explained as an example, but the present invention may be applied to a probe having a single vibrator or one-dimensional or two-dimensional array probe in another form.

As shown in FIGS. 1 and 2, the ultrasonic probe has a backing material 1 having a shape convex upward, plural ultrasonic transducers (piezoelectric vibrators) 2 one-dimensionally arranged on the backing material 1, a resin 3 filling between those piezoelectric vibrators 2, one or some acoustic matching layers (two acoustic matching layers 4a and 4b are shown in FIGS. 1 and 2) provided on the piezoelectric vibrators 2, an acoustic lens 5 provided on the acoustic matching layers according to need, flexible printed circuit boards (FPCs) 6 fixed onto both side surfaces and the bottom surface of the backing material 1, insulating resins 7 formed on the side surfaces of the backing material 1, the piezoelectric vibrators 2, and the acoustic matching layers 4a and 4b via the FPCs 6, and electric wiring 8 and a connector 9 connected to the FPCs 6.

In FIG. 1, the acoustic matching layers 4a and 4b and the acoustic lens 5 are cut for showing the arrangement of the piezoelectric vibrators 2. In the embodiment, the plural piezoelectric vibrators 2 arranged in the X-axis direction form a one-dimensional vibrator array. Here, the thickness of the backing material 1 (in the Z-axis direction) is 3 mm, the thickness of the piezoelectric vibrators 2 (in the Z-axis direction) is 250 µm, and the width of the piezoelectric vibrators 2 (in the X-axis direction) is 100 µm.

As shown in FIG. 2, the piezoelectric vibrator 2 includes an individual electrode 2a formed on the backing material 1, a piezoelectric material 2b formed on the individual electrode 2a, and a common electrode 2c formed on the piezoelectric material 2b. Typically, the common electrode 2c is commonly connected to the ground potential (GND). The individual electrodes 2a of the plural piezoelectric vibrators 2 are connected to the electric wiring 8 via printed wiring formed on the two FPCs 6 fixed onto the both side surfaces and the bottom surface of the backing material 1.

Figure 3:
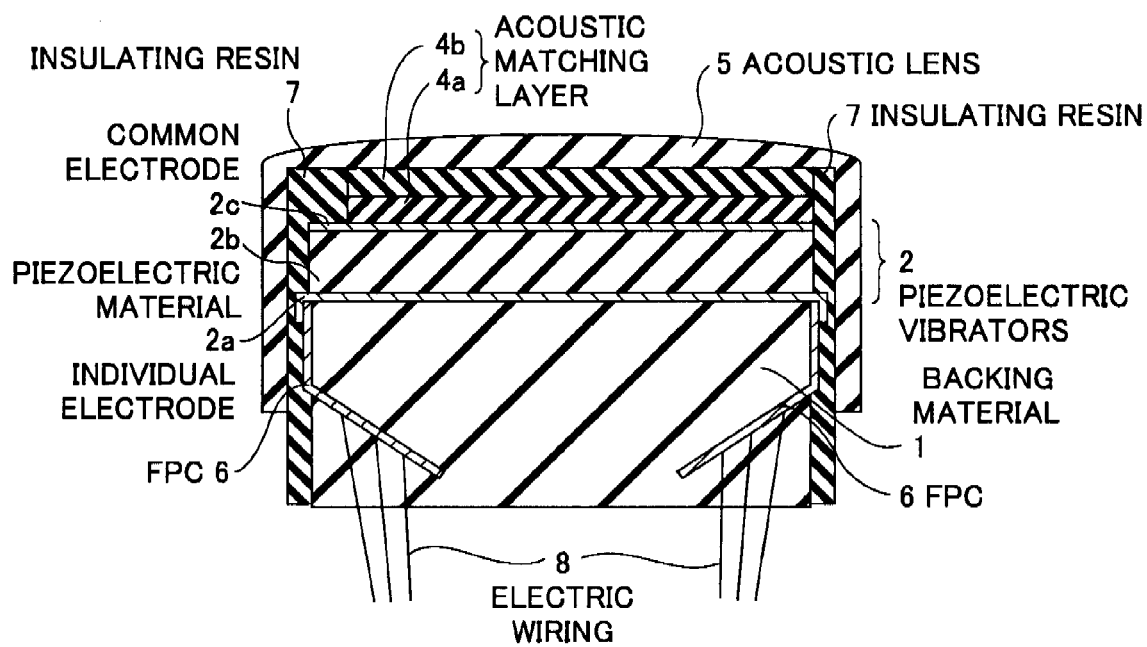
FIG. 3 is a sectional view of an internal structure of an ultrasonic probe according to a modified example of the one embodiment of the present invention along a plane in parallel with the YZ-plane.

FIG. 3 is a sectional view of an internal structure of an ultrasonic probe according to a modified example of the one embodiment of the present invention along a plane in parallel with the YZ-plane. In the modified example, part of the FPCs 6 is fixed to the interior of the backing material 1. When the vibrators are arrayed, many interconnections are required. Especially in the ultrasonic endoscope, it is necessary to downsize the ultrasonic probe, and therefore, the ultrasonic probe must have an interconnection structure on the side surfaces or inside of the backing material 1. Therefore, the backing material 1 requires an insulation property.

As below, the backing material according to the one embodiment of the present invention will be explained.

Figure 4A:
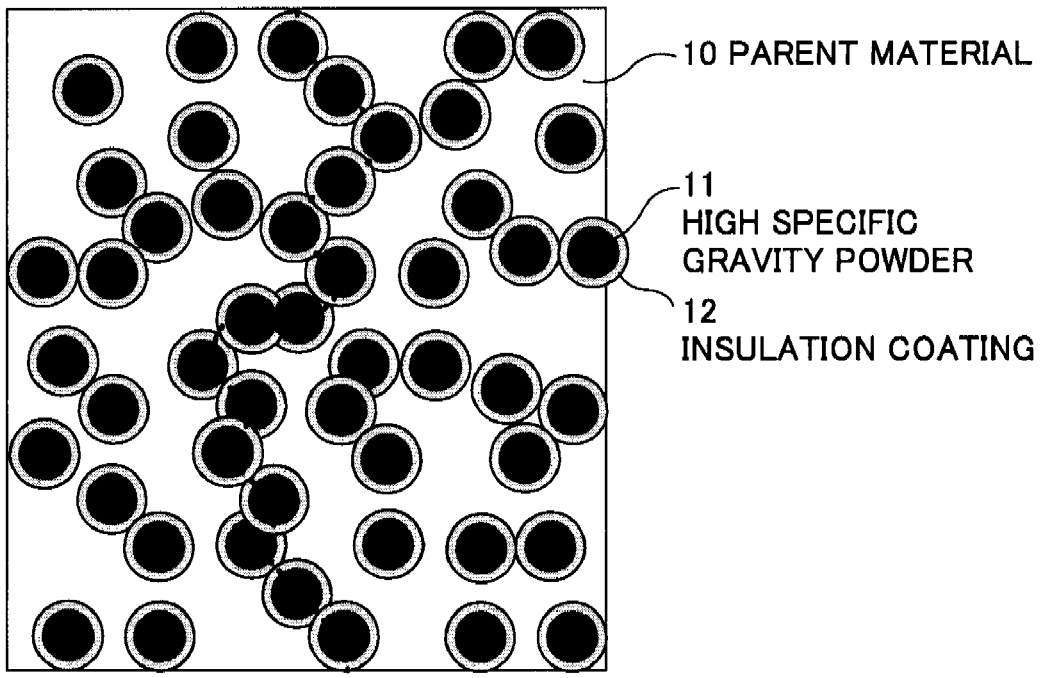
FIG. 4A schematically shows a structure of the backing material according to the one embodiment of the preset invention.
Figure 4B:
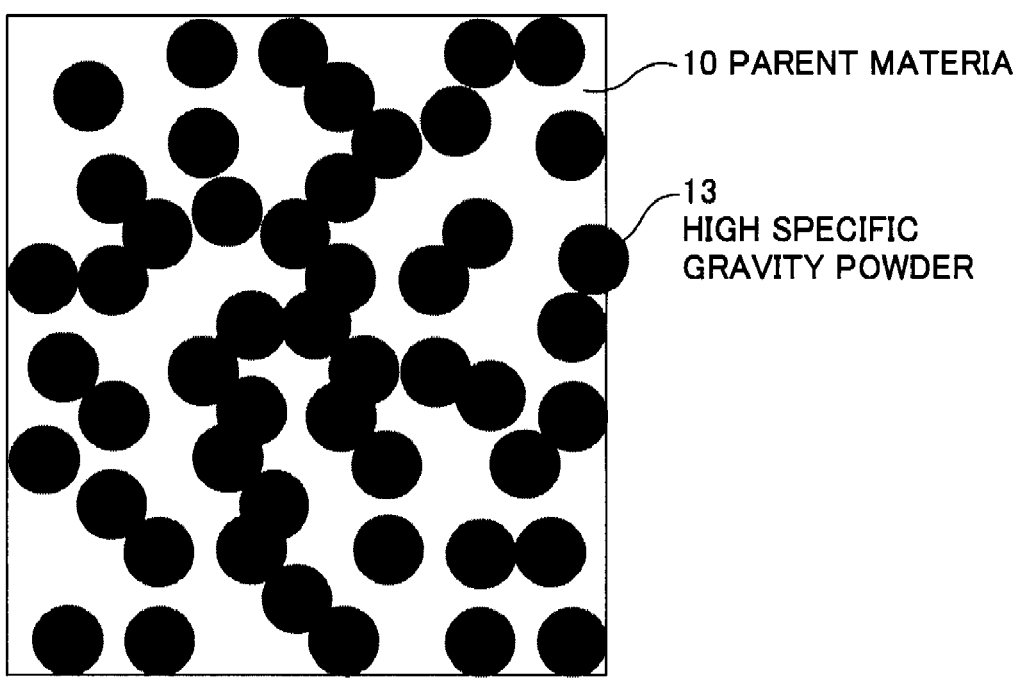
FIG. 4B schematically shows a structure of a conventional backing material.

FIG. 4A schematically shows a structure of the backing material according to the one embodiment of the preset invention, and FIG. 4B schematically shows a structure of a conventional backing material. In the embodiment, as shown in FIG. 4A, the backing material is fabricated by dispersing composite powder, in which insulation coatings 12 are formed on the surfaces of particles of high specific gravity powder 11, to fill a parent material 10 of insulative elastomer or resin. On the other hand, in the conventional backing material, as shown in FIG. 4B, high specific gravity powder 13 is dispersed to fill the parent material 10 of insulative elastomer or resin.

As the insulative parent material 10, for example, rubbers such as isoprene rubber, chloroprene rubber, styrene rubber, silicone rubber, etc. as elastomer, and epoxy resin, urethane resin, ABS resin, etc. as resin can be used. The high specific gravity powder 11 or 13 has larger acoustic impedance then that of the parent material 10 and conductivity.

In the conventional backing material shown in FIG. 4B, if the filling rate of the high specific gravity powder 13 is made higher, percolation conduction, in which many particles of the high specific gravity powder 13 filling the backing material contact one another to form conduction paths, occurs (solid line). On the other hand, in the backing material according to the embodiment shown in FIG. 4A, the surfaces of particles of high specific gravity powder 11 are covered by the insulation coatings 12, and thus, even when the filling rate of the high specific gravity powder 11 is made higher, only the insulation coatings 12 contact one another and no conduction path is formed (broken line).

Further, in the conventional backing material shown in FIG. 4B, since the high specific gravity powder 13 directly contacts the parent material 10, the cross-linking and curing reaction of the elastomer or resin becomes unstable due to the catalyst effect of the transition metals, and it is difficult to obtain a backing material having homogeneous acoustic characteristics. On the other hand, in the backing material according to the embodiment shown in FIG. 4A, since surfaces of particles of high specific gravity powder 11 are covered by the insulation coatings 12, the high specific gravity powder 11 does not directly contact the parent material 10, and the cross-linking and curing reaction of the elastomer or resin never becomes unstable.

In the embodiment, as a material of the high specific gravity powder 11, a transition metal or an inorganic material partially containing a transition metal is used. Specifically, tungsten (W; density 19,200 kg/m$^3$), tantalum (Ta; density 16,700 kg/m$^3$), gold (Au; density 19,300 kg/m$^3$), platinum (Pt; density 21,100 kg/m$^3$), iridium (Ir; density 22,700 kg/m$^3$), tungsten carbide (WC; density 15,600 kg/m$^3$), tantalum carbide (TaC; density 14,500 kg/m$^3$), tungsten silicide (WSi$_2$), or the like may be used. Among them, powder of tungsten or tantalum or powder of a chemical compound of them is generally used because noble metals are expensive.

Further, as a material of the insulting coating 12, among an oxide of an element of group XIII to group XV according to the notation of International Union of Pure and Applied Chemistry (IUPAC), except for carbon (C), nitrogen (N), phosphorus (P) as nonmetal elements, i.e., oxides of metal elements of group XIII to group XV or oxides of semimetal elements of group XIII to group XV may be used. Specifically, oxides of aluminum (Al), gallium (G), indium (In), tin (Sn), thallium (Tl), lead (Pb), bismuth (Bi) as metal elements, and oxides of boron (B), silicon (Si), germanium (Ge), arsenic (As), antimony (Sb) as semimetal elements may be used. Among them, silicon oxide (SiO$_2$), aluminum oxide (Al$_2$O$_3$), and boron oxide (B$_2$O$_3$) are especially suitable.

Next, a method of manufacturing the backing material according to the one embodiment of the present invention will be explained. In the embodiment as below, the case where silicone rubber is used as the parent material, tungsten carbide (WC) is used as a material of the high specific gravity powder, silicon oxide (SiO$_2$) or aluminum oxide (Al$_2$O$_3$) made from alkoxide of silicon (Si) or aluminum (Al) is used as a material of the insulation coatings, and ethanol is used as alcohol will be explained, but other materials may be used in the present invention.

(1) Fabrication of Composite Powder

In order to manufacture the backing material according to the embodiment, it is necessary to form insulation coatings on the surfaces of the particles of the high specific gravity powder. First, using a beaker, a mixture liquid is prepared by adding 20 g of powder of tungsten carbide to 200 g of anhydrous alcohol in which alkoxide of silicon or aluminum has been dissolved.

As the alkoxide of silicon, tetra-ethoxy-silane (TEOS: Si(OCH$_2$CH$_3$)$_4$) is used. Alternatively, tetra-methoxy-silane, tetra-propoxy-silane, tetra-butoxy-silane, or the like may be used. Further, as the alkoxide of aluminum, tri-isopropoxy-aluminum (Al-i-Pr: Al(OCH(CH$_3$)$_2$)$_3$) is used. Alternatively, tri-methoxy-aluminum, tri-ethoxy-aluminum, tri-butoxy-aluminum, or the like may be used.

Then, 100 g of ethanol containing 10 wt % of water in weight concentration is dropped into the beaker of the mixture liquid that has been stirred and suspended to decompose (hydrolyze) the alkoxide within the mixture liquid, and thereby, insulation coatings containing silicon oxide ($SiO_2$) or aluminum oxide ($Al_2O_3$) are formed on the surfaces of the particles of the tungsten carbide powder. If the weight concentration of the water in the hydrous ethanol to be dropped is high, the ratio of spontaneous nucleation of the alkoxide-decomposed matter becomes higher and formation of coatings by ripening becomes difficult. On the other hand, if the weight concentration of the water in the hydrous ethanol to be dropped is low, the hydrolysis may take a long time or unreacted matter may remain. Therefore, the weight concentration of the water in the hydrous ethanol to be dropped is preferably set to 50 wt % or less, more preferably set to 5 wt % to 20 wt %.

In order to promote the hydrolysis reaction, it is preferable that the mixture liquid may be heated during dropping of the hydrous ethanol to a temperature of about 60° C., or made mild acidic of substantially pH2 to substantially pH4 by adding hydrochloric acid or the like to the hydrous ethanol to be dropped. Further, in order to complete the hydrolysis reaction, it is preferable that destructive distillation may be performed for several hours while heating is kept after dropping of the hydrous ethanol. Then, the mixture liquid is held at a temperature of 100° C. for evaporation of the liquid component, and further, the dried powder is held at a temperature of 300° C. for two hours. Thereby, dense coatings can be formed.

FIGS. 5A and 5B are tables showing data of plural samples to be used in the method of manufacturing the backing material according to the one embodiment of the present invention. In FIG. 5A, median diameters (μm) of tungsten carbide powder, amounts of TEOS (g), and equivalent $SiO_2$ thicknesses (μm) are shown with respect to samples Nos. 1-8 in the case where coatings of silicon oxide ($SiO_2$) are formed. Further, in FIG. 5B, median diameters (μm) of tungsten carbide powder, amounts of Al-i-Pr (g), and equivalent $Al_2O_3$ thicknesses (μm) are shown with respect to samples Nos. 9-16 in the case where coatings of aluminum oxide ($Al_2O_3$) are formed. Here, the median diameter refers to a mean value of diameters measured with respect to plural particles of the powder by using a particle size distribution analyzer.

Since it is difficult to directly measure the thickness of the insulation coating, the thickness of the insulation coating formed on the surface of the spherical powder having the median diameter is obtained by calculation based on the amount of alkoxide. Given that the median diameter of the powder is "d" (μm) and the density of the powder is "ρ" ($kg/m^3$), the sphere equivalent surface area "S" ($m^2$) per 1 g of powder is expressed by the following equation.

$$S = 6{,}000/(\rho \cdot d)$$

For example, since the density "ρ" of tungsten carbide is 15,600 $kg/m^3$, the sphere equivalent surface area "S" per 20 g of powder having a diameter of 4.8 μm is 1.603 $m^2$, and the sphere equivalent surface area "S" per 20 g of powder having a diameter of 8.7 μm is 0.884 $m^2$.

The number of moles of alkoxide is obtained by dividing the mass (g) of alkoxide by the molecular weight of alkoxide. The molecular weight of alkoxide is 208 for tetra-ethoxysilane (TEOS: $Si(OCH_2CH_3)_4$) and 204 for tri-isopropoxy-aluminum (Al-i-Pr: $Al(OCH(CH_3)_2)_3$), and can be calculated based on the chemical formula for another alkoxide. In the case where TEOS is hydrolyzed and coatings of silicon oxide ($SiO_2$) are formed, the number of moles of silicon oxide is equal to the number of moles of TEOS. Further, in the case where Al-i-Pr is hydrolyzed and coatings of aluminum oxide ($Al_2O_3$) are formed, the number of moles of aluminum oxide is half the number of moles of Al-i-Pr.

The thickness "t" (μm) of the formed insulation coatings of oxide is obtained by dividing the product of the number of moles "N" and the molecular weight "M" of the oxide by the density "ρ" ($kg/m^3$) and the sphere equivalent surface area "S" ($m^2$) as expressed by the following equation.

$$t = 1{,}000 \cdot N \cdot M/(\rho \cdot S)$$

Here, the molecular weight of the silicon oxide ($SiO_2$) is 60 and the density "ρ" is 2,200 $kg/m^3$, and the molecular weight of the aluminum oxide ($Al_2O_3$) is 102 and the density "ρ" is 3,900 $kg/m^3$.

Specifically, in the case where the silicon oxide coatings are formed on 20 g of tungsten carbide powder having a diameter of 4.8 μm (sphere equivalent surface area S=1.603 $m^2$) by using 1.0 g (0.0481 mol) of TEOS as the sample No. 1, since 0.0481 mol of silicon oxide in the same number of moles of TEOS is formed on the surfaces of the powder, the covering thickness of silicon oxide is 0.0481×60/(2.2×1.603)=0.082 μm. In the case where the amount of TEOS is 5.0 g as the sample No. 4, the number of moles of silicon oxide is 0.02404 mol and the covering thickness of silicon oxide is 0.409 μm. In the case where the diameter of the particles of the powder is 8.7 μm, the equivalent surface area "S" of 20 g of tungsten carbide powder is 0.884 $m^2$, and the covering thickness of silicon oxide is 0.148 μm.

Further, in the case where the aluminum oxide coatings are formed on 20 g of tungsten carbide powder having a diameter of 4.8 μm (sphere equivalent surface area S=1.603 $m^2$) by using 1.0 g (0.00490 mol) of Al-i-Pr as the sample No. 9, the number of moles of aluminum oxide is 0.00245 mol, and the covering thickness of aluminum oxide is 0.040 μm.

(2) Fabrication of Backing Material

The prepared composite powder, silicone rubber, and curing agent are formulated such that the weight concentration of the composite powder is 95 wt % and mixed and the silicone rubber is cured, and thereby, the backing material is fabricated. Here, before curing of the silicone rubber, the admixture may be vacuum-deaerated. Further, at the time of curing of the silicone rubber, curing is preferably performed while pressing at pressure of about 1 MPa for avoiding the mixture of air bubbles.

(3) Evaluation of Backing Material

Figures 6, 7:
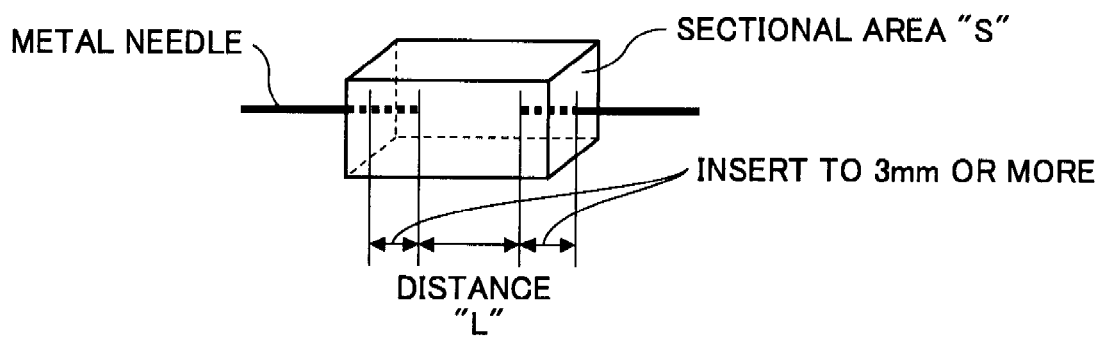
FIG. 6 is a table showing results of performance measurement of backing materials in working examples of the present invention and comparative examples.
FIG. 7 shows a condition when a resistance value of the backing material is measured.

FIG. 6 is a table showing results of performance measurement of backing materials in working examples of the present invention and comparative examples. The working examples of the present invention are 16 types of backing materials manufactured by using composite powder of samples Nos. 1-16, respectively. On the other hand, the comparative examples are a backing material manufactured by using powder of sample No. 17 formed by performing the same treatment as that on the sample No. 1 on the same tungsten carbide powder of 4.8 μm in median diameter as the sample No. 1 without adding alkoxide thereto, and a backing material manufactured by using powder of sample No. 18 formed by performing the same treatment as that on the sample No. 5 on the same tungsten carbide powder of 8.7 μm in median diameter as the sample No. 5 without adding alkoxide thereto.

The backing materials of the working examples and comparative examples were processed to be in thickness of 10 mm, and the acoustic impedance values were calculated by using the equation (1) based on the density "ρ" obtained according to the principle of Archimedes and the sound velocity "v" obtained from the reflection time of ultrasonic waves. Further, the backing materials of the working examples and comparative examples were processed to be 5 mm-square in length of 10 mm. A resistance value "r" was measured by inserting two metal needles, each having a diameter of about 0.3 mm and a sharp tip, to 3 mm or more from both ends of the backing material as shown in FIG. 7, and a specific resistance R was calculated by the following equation.

$$R = r \cdot S/L$$

where "S" is a sectional area of the backing material, and "L" is a distance between the tips of the two metal needles.

In the backing materials of the working examples manufactured by using the samples Nos. 1-16, the density and the sound velocity are stable and homogenous acoustic impedance within ±0.2 MRayl were obtained. In the three types of backing materials manufactured by using the samples Nos. 3, 4, and 8, the acoustic impedance values are lower because the thicknesses of the insulation coatings are large relative to the diameter of the used tungsten carbide powder, and the ratio of the tungsten carbide in the composite powder becomes lower and the density of the backing materials becomes lower. Therefore, the acoustic impedance value can be made higher by raising the filling rate of the composite powder.

Further, the larger the thickness of the insulation coatings becomes, the larger the specific resistance value becomes. With 0.1 μm or more thickness of the insulation coatings, the specific resistance value was $10^{10}$ Ω·cm or more and good insulation resistance was obtained. In this case, no current leak occurs even when electric wirings are made on the side surfaces or inside of the backing materials.

On the other hand, in the backing materials of the comparative examples, with the typical curing agent concentration, the curing reaction progressed immediately after addition of the powder to silicone rubber and the filling rate became inhomogeneous, and acoustic impedances largely varied. In observation of the section of the backing materials, air bubbles of 20 μm to 100 μm were recognized within the silicone rubber. Further, in the backing material manufactured by using the sample No. 17, the specific resistance value was 2000 Ω·cm or less, and in the backing material manufactured by using the sample No. 18, the specific resistance value was 500 Ω·cm or less. Their insulation properties were insufficient.

The invention claimed is:

1. A backing material provided on a backside of vibrators for transmitting and/or receiving ultrasonic waves in an ultrasonic probe, said backing material comprising:
   a parent material containing one of elastomer and resin and having an insulation property; and
   composite powder dispersed to fill said parent material, said composite powder including powder of a material having a larger acoustic impedance than that of said parent material and an insulation coating for covering a surface of said powder, said insulation coating containing an oxide of an element of group XIII to group XV except for carbon (C), nitrogen (N), phosphorus (P).

2. The backing material according to claim 1, wherein said powder is an inorganic material containing a transition metal element.

3. The backing material according to claim 1, wherein said insulation coating contains one of silicon oxide ($SiO_2$) and aluminum oxide ($Al_2O_3$).

4. The backing material according to claim 1, wherein said insulation coating has a thickness of not less than 0.1 μm.

5. An ultrasonic probe comprising:
   vibrators for transmitting and/or receiving ultrasonic waves; and
   a backing material provided on a backside of said vibrators, said backing material including a parent material containing one of elastomer and resin and having an insulation property, and composite powder dispersed to fill said parent material, said composite powder including powder of a material having a larger acoustic impedance than that of said parent material and an insulation coating for covering a surface of said powder, said insulation coating containing an oxide of an element of group XIII to group XV except for carbon (C), nitrogen (N), phosphorus (P).

6. The ultrasonic probe according to claim 5, wherein said powder is an inorganic material containing a transition metal element.

7. The ultrasonic probe according to claim 5, wherein said insulation coating contains one of silicon oxide ($SiO_2$) and aluminum oxide ($Al_2O_3$).

8. The ultrasonic probe according to claim 5, wherein said insulation coating has a thickness of not less than 0.1 μm.

9. A method of manufacturing a backing material provided on a backside of vibrators for transmitting and/or receiving ultrasonic waves in an ultrasonic probe, said method comprising the steps of:
   preparing a parent material containing one of elastomer and resin and having an insulation property;
   adding an alkoxide of an element of group XIII to group XV except for carbon (C), nitrogen (N), phosphorus (P) and powder of a material having a larger acoustic impedance than that of said parent material into anhydrous alcohol and stirring them to make a mixture liquid;
   adding alcohol and water into said mixture liquid for hydrolysis of the alkoxide in said mixture liquid and heating said mixture liquid for evaporation of the alcohol and water to form an insulation coating containing an oxide of an element of group XIII to group XV except for carbon (C), nitrogen (N), phosphorus (P) on a surface of said powder so as to make composite powder; and
   dispersing said composite powder to fill said parent material and curing said parent material with a curing agent.

* * * * *